Dec. 17, 1968  R. N. GREENFIELD  3,416,689

CONTAINER CONTENTS EXTRACTOR

Filed May 29, 1967

INVENTOR:
RONALD N. GREENFIELD
BY
Harrington A. Lackey
ATTORNEY

United States Patent Office 3,416,689
Patented Dec. 17, 1968

3,416,689
CONTAINER CONTENTS EXTRACTOR
Ronald N. Greenfield, 2516 Gallatin Road,
Nashville, Tenn. 37206
Filed May 29, 1967, Ser. No. 642,057
3 Claims. (Cl. 215—100)

ABSTRACT OF THE DISCLOSURE

An extractor for the contents of a container having a base and an upright stem, the upper end of the stem being enlarged to provide a finger grip and pointed to pierce the contents.

Background of the invention

This invention relates to a container contents extractor, and more particularly to a device for extracting solid contents, such as Vienna sausages, from their container.

Devices for extracting solid contents from a container, such as olive trees, are known in the art. Moreover, there are certain types of extractors having a base and an upstanding handle for fiitting within the container so that the base is beneath the contents, for lifting the contents from the container when the container is open.

However, such extractors have certain disadvantages, such as the lack of adequate means for gripping the upright handle member, the lack of means for readily removing the solid contents from the extractor, should the extractor be of a type for piercing the contents, and an unnecessarily high weight/strength ratio.

Summary of the invention

This invention relates to a container contents extractor adapted to overcome the disadvantages above enumerated.

The extractor made in accordance with this invention incorporates a base adapted to fit within the bottom of a container from which the solid contents are to be extracted. An upright stem projects upwardly from the base substantially the full height of the container, but beneath the cover in closed position. The upper end of the stem terminates in an upwardly pointing, sharp tip which will readily penetrate the solid contents, if encountered, and is also enlarged to provide means for easily gripping the stem at its upper end for readily lifting the extractor from the container.

Another object of this invetnion is to provide an enlarged upper end for the extractor stem having a downwardly converging, tapered bottom portion merging into the portion of the stem below the upper end so that any solid contents impaled upon the stem may be easily removed over the upper end.

A further object of this invetnion is to provide an upright stem of a contents extractor which gradually diverges downwardly to the base in order to provide minimum displacement of any materials impaled upon the stem, and also to provide maximum or optimum strength within the extractor.

Another object of this invetnion is to provide a container contents extractor, particularly adapted for extracting from a container Vienna sausages, or similar articles.

A further object of this invention is to provide a container contents extractor having a base designed to engage the bottom portions of a plurality of upstanding objects in a container, with a minimum of material in the base.

A further object of this invetnion is to provide a container contents extractor including a base and an upright stem in which the stem is mounted off-center of the base in order to project between articles within the container.

A further object of this invention is to provide a container contents extractor of simple construction which can be made economically and with a minimum of materials, yet with adequate strength for supporting and removing solid objects from the container.

Description of the preferred embodiment

Figure 1:
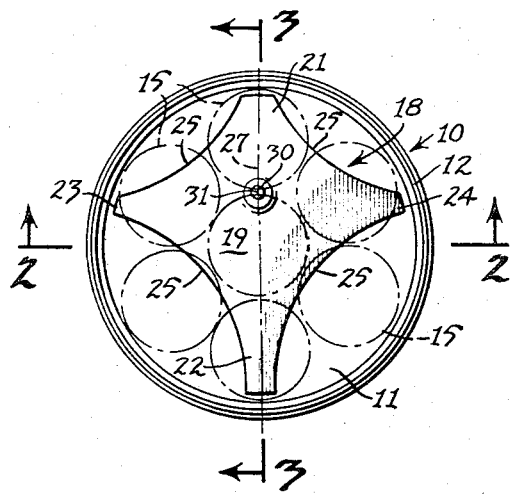
FIG. 1 is a top plan view of the invention in operative position within a cylindrical container, with the cover removed.
Figure 2:
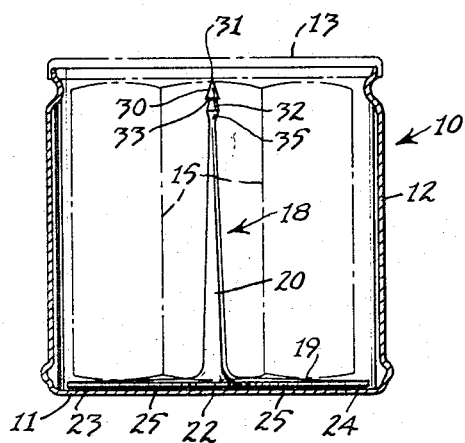
FIG. 2 is a section taken through the container along the line 2—2 of FIG. 1, with the extractor disclosed in end elevation, and with the cover disclosed in phantom in closed position.
Figure 3:
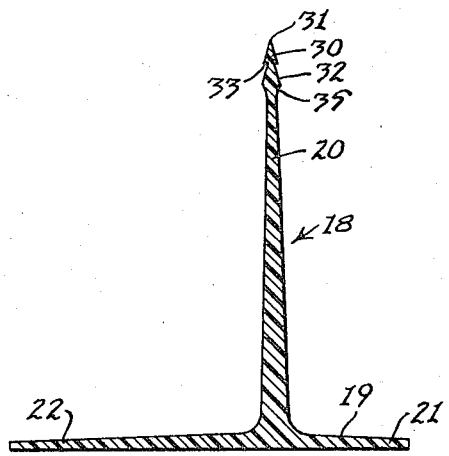
FIG. 3 is a section taken along the line 3—3 of FIG. 1 through the extractor, with the container removed.

Referring now to the drawings in more detail, FIGS. 1 and 2 disclose a substantially cylindrical container 10 having a bottom wall 11, cylindrical side wall 12 and a removable top or cover 13. The contents disclosed within the container 10, by way of example, are Vienna sausages 15, shown in phantom. The container 10 is disclosed as large enough to support one sausage 15 in the center and a plurality of sausages 15 (six) arranged circumferentially around the center sausage.

The contents extractor 18 is preferably a unitary molded piece of plastic, metal or any other convenient material including a base 19 and an upright stem 20.

As disclosed in the drawings, the base 19 is preferably of a cruciform shape having a short longitudinal arm 21, a long longitudinal arm 22 and a pair of transverse or lateral arms 23 and 24. The outer edges or extremities of all the arms 21–24 substantially describe a circle having a diameter slightly less than the diameter of the bottom wall 11. The extremities of the arms 21–24 are connected by concavely curved edges 25, which represent portions cut-out or relieved from a disc having a diameter equal to the length of the base 19, in order to eliminate excess material and weight without affecting the strength and ability of the base to lift all of the materials 15 from the container 10. FIG. 1 discloses the relative amount of material which has been eliminated from a truly circular base. Such material reduction effects a considerable economy in the manufacture of the extractors 18, particularly where such extractors are produced in volume. Moreover, a considerable economy is effected in transportation charges based on weight.

As best disclosed in FIG. 1, the stem 20 is preferably mounted on the longitudinali axis 27 of the base 19 and disposed about one-third of the length of the base from the extremity of the short arm 21, and consequently about two-thirds of the lentgh of the base 19 from the extremity of the long arm 22. The purpose of this location is so that the stem 20 will preferably, normally project upwardly between a pair of sausages 15, rather than to extend through a sausage. Although the stem 20 is adapted to readily pierce any one of the sausages 15 as will be presently described, nevertheless the upper end 30 of the stem 20 may be more easily gripped by the fingers of a person if the stem projects between the sausages 15, because the periphery of the top surface of each sausage is lower than the center portion.

Although the stem 20 is located upon the base 19 so that it may extend between the articles, such as sausages 15 arranged as disclosed in FIG. 1, nevertheless, the upper end 30 has a sharply pointed, upwardly directed tip 31 to readily pierce such articles, if necessary. The upper end 30 is also enlarged, that is, larger than the portion of the stem 20 immediately below the upper end 30, in order to provide an adequate finger grip to assist in pulling the extractor 18 upwardly with its contents 15. The grip on the enlarged upper end 30 is further improved by an elongated circumferential recess 32 terminating at its upper end in a laterally, and preferably radially, extending upper wall 33. The upper wall 33 is disclosed in the form of a radial rim or ring forming the base of the sharp pointed conical tip 31. Thus, if the person extracting the contents of the container 10 cannot grip the entire enlarged portion 30, because of the height of the contents 15, then he may be able to project his fingernails beneath the upper wall 33 sufficiently to grip the stem 20 and elevate the extractor 18, with its entire contents 15, from the container 10. Even if the upper wall 33 is buried beneath the top of the article, such as the sausage 15, the operator can move his fingernails downwardly along the tip 31, depressing the surrounding material, until his fingernails engage the recessed upper wall 33.

The recess 32 is also of a frusto-conical shape converging upwardly in the same manner as the tip 31 to facilitate the piercing operation of the stem 20 through the contents 15, should such be necessary.

However, the bottom portion 35 of the upper end 30 is also tapered, but converges downwardly to merge into the portion of the stem 20 below the upper end 30. The purpose of this tapering bottom portion 35 is to facilitate removing the contents, such as the sausages 15, from the stem 18 after they have been extracted from the container 10.

Another feature of this invention is the formation of the portion of the stem 20 below the upper end 30 in a gradually diverging taper all the way downwardly to the base 19. A stem 20 tapered in this manner, will displace less material from the contents 15, when pierced, than a cylindrical stem having a diameter of the bottom portion of the stem 30, without sacrificing strength. The taper of the stem 20 is diverging downwardly since the bottom portion of the stem 20 must be stronger at its interconnection with the base 19.

In the operation of the invention, the extractor 18 is first inserted within the container 10 so that the base 19 rests on the bottom wall 11. The contents, such as Vienna sausages 15, are then packed within the container 10, such as in the arrangement disclosed in FIG. 1, with the stem 20 projecting upwardly between a pair of sausages 15. In such position, the upper end 30 projects above the upper surfaces of the sausages 15. If the sausages 15 are not packed too tightly, then the stem 20 will extend upwardly between the sausages 15 without piercing either one. However, if the packing is very tight, there may be piercing along one or the other surface of the adjacent sausages 15. If the arrangement is different from that disclosed in FIG. 1, then the stem 20 may pierce the entire length of one sausage 15. After the container is filled, the cover 13 is closed and the container is ready for shipment, storage or display.

When the consumer desires to use the contents of the container 10, the cover 13 is removed, and the consumer's fingers are gripped firmly around the upper end 30, as low as possible. In any event, the grip will not have to be any higher than the upper wall 33 of the recess 32, which can be gripped even by the fingernails. After the upper end 30 is gripped by the consumer, stem 20 is pulled vertically upwardly, simultaneously elevating the base 19 and the contents 15.

This extraction operation is not only easier than attempting to extract the sausages 15 without the extractor 18, but is also swifter, cleaner and enables the consumer to empty the entire contents of the container 10 at once.

Moreover, if one of the sausages 15 is impaled upon the stem 20 after the extractor 18 is removed from the container 10, then it may be easily removed by pulling the sausage along the converging surface of the stem 20 and over the end 30, not only easily, but with a minimum of the contents of the sausage removed by the displacement of the stem 20.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A container contents extractor comprising:
    (a) a laterally extending base adapted to be received within and upon the bottom of a container and to engage the bottom portions of solid contents within the container,
    (b) an elongated stem having a substantially circular cross-section mounted on and projecting upwardly from said base,
    (c) said stem terminating in an enlarged upper end portion having an upper tip portion, an intermediate portion and a lower portion,
    (d) said tip portion converging upward to a sharp point,
    (e) said intermediate portion comprising an annular recess defining an annular, laterally extending, upper wall forming the base of said tip portion to provide a finger grip for pulling said stem upwardly,
    (f) said lower portion comprising an annular enlargement having a lateral extent approximately the same as said upper wall, said lower portion converging downwardly from said enlargement to merge with said stem.

2. The invention according to claim 1 in which the portion of said stem below said upper end portion diverges gradually downwardly to said base.

3. The invention according to claim 1 in which said annular recess is frusto-conical diverging downwardly and merging with said enlargement of said lower portion.

References Cited
UNITED STATES PATENTS

| | | | |
|---|---|---|---|
| 522,693 | 7/1894 | McLaughlin. | |
| 2,904,205 | 9/1959 | Callery | 220—93 X |
| 2,920,779 | 1/1960 | Armitage | 215—100 |
| 2,983,369 | 5/1961 | Rogovin. | |
| 3,314,533 | 4/1967 | Kopfle. | |

RAPHAEL H. SCHWARTZ, *Primary Examiner.*